(12) United States Patent
Kinoshita et al.

(10) Patent No.: US 9,228,252 B2
(45) Date of Patent: Jan. 5, 2016

(54) HARD ALLOY AND CUTTING TOOL

(75) Inventors: Hideyoshi Kinoshita, Satsumasendai (JP); Katsuhiro Hanaki, Anjo (JP); Kouji Hirosaki, Satsumasendai (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 29 days.

(21) Appl. No.: 14/129,492

(22) PCT Filed: Jun. 27, 2012

(86) PCT No.: PCT/JP2012/066409
§ 371 (c)(1),
(2), (4) Date: Dec. 26, 2013

(87) PCT Pub. No.: WO2013/002270
PCT Pub. Date: Jan. 3, 2013

(65) Prior Publication Data
US 2014/0127527 A1    May 8, 2014

(30) Foreign Application Priority Data

Jun. 27, 2011 (JP) .................................. 2011-141916
Sep. 20, 2011 (JP) .................................. 2011-204787
Oct. 28, 2011 (JP) .................................. 2011-237452

(51) Int. Cl.
*C22C 29/08* (2006.01)
*C22C 29/04* (2006.01)
*B22F 3/10* (2006.01)
(Continued)

(52) U.S. Cl.
CPC .............. *C22C 29/04* (2013.01); *B22F 3/1007* (2013.01); *C04B 35/5626* (2013.01); *C22C 29/08* (2013.01); *B22F 2005/001* (2013.01); *Y10T 428/12146* (2015.01); *Y10T 428/26* (2015.01)

(58) Field of Classification Search
USPC ............ 51/307, 309; 428/216, 325, 336, 697, 428/698, 699, 701, 702; 407/119
See application file for complete search history.

(56) References Cited

U.S. PATENT DOCUMENTS 5,066,553 A * 11/1991 Yoshimura et al. ............. 51/309
5,503,925 A *  4/1996 Nakano et al. ................ 428/336
5,716,170 A *  2/1998 Kammermeier et al. ..... 407/119

(Continued)

FOREIGN PATENT DOCUMENTS

JP    07-011375    1/1995
JP    10-138027    5/1998

(Continued)

OTHER PUBLICATIONS

English Translation of International Search Report issued in PCT/JP2012/066409 dated Aug. 15, 2012.

*Primary Examiner* — Archene Turner

(57) ABSTRACT

A hard alloy and a cutting tool. The hard alloy includes a hard phase and a binder phase. The hard phase includes: a main phase containing 50-70 mass % of WC, 15-30 mass % of TiCN, and 0-10 mass % of at least one kind of carbide, nitride or carbonitride of one or more non-W, non-Ti periodic table Group 4, 5 or 6 metal; a WC phase; and a composite hard phase. The binder phase includes 6 to 12 mass % of at least one of Co and Ni. The hard alloy includes a surface portion at a surface thereof, the surface portion having a WC content higher than that of an internal portion thereof. An average size of grains in the WC phase in the surface portion is larger than an average size of grains in the WC phase in the internal portion.

13 Claims, 4 Drawing Sheets

(51) Int. Cl.
*C04B 35/56* (2006.01)
*B22F 5/00* (2006.01)

(56) References Cited

U.S. PATENT DOCUMENTS

| | | | |
|---|---|---|---|
| 5,733,668 | A | 3/1998 | Kameoka |
| 6,027,808 | A | 2/2000 | Aoki |
| 6,299,992 | B1 * | 10/2001 | Lindskog et al. ............... 51/307 |
| 6,468,680 | B1 * | 10/2002 | Waldenstrom et al. ....... 428/698 |
| 6,890,655 | B2 * | 5/2005 | Liu et al. ....................... 428/472 |
| 7,384,689 | B2 * | 6/2008 | Mikus .......................... 428/325 |
| 7,544,410 | B2 * | 6/2009 | Lengauer et al. ............. 428/698 |
| 8,277,959 | B2 * | 10/2012 | Arvanitidis ................... 428/698 |
| 2012/0114960 | A1 | 5/2012 | Takesawa et al. |

FOREIGN PATENT DOCUMENTS

| | | |
|---|---|---|
| JP | 2009-275237 | 11/2009 |
| WO | 2011002008 | 1/2011 |

* cited by examiner

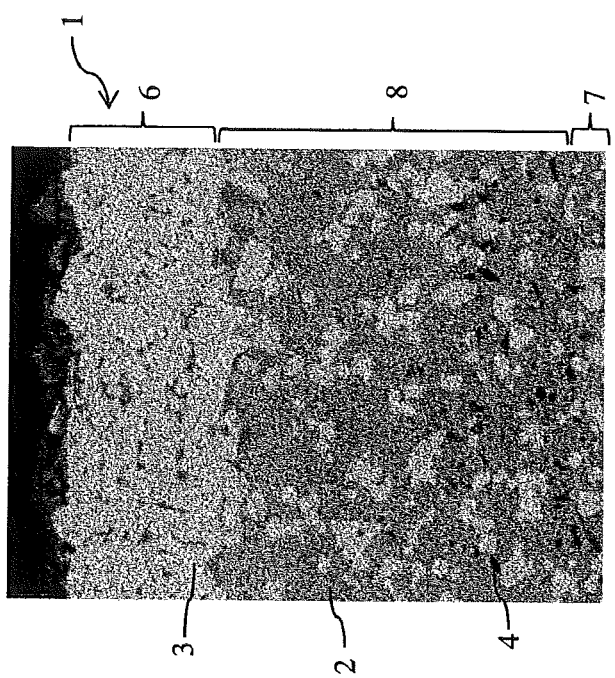

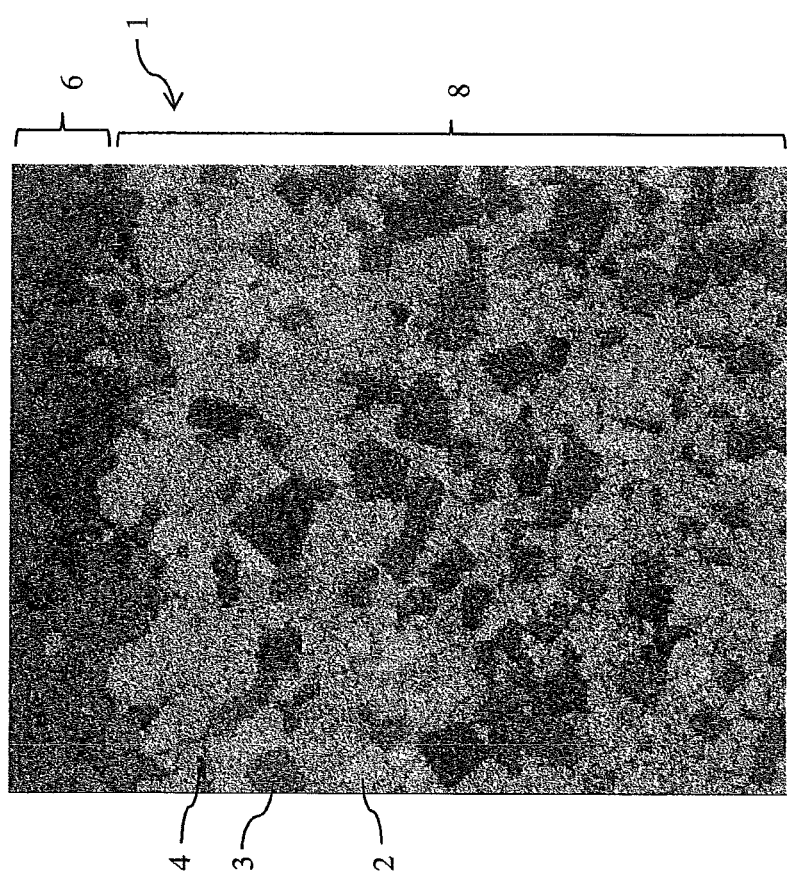

US 9,228,252 B2

HARD ALLOY AND CUTTING TOOL

CROSS-REFERENCE TO RELATED APPLICATIONS

This application is a national phase of the International application PCT/JP2012/066409 filed Jun. 27, 2012 that claims priority from the Japanese patent application JP2011-141916 filed Jun. 27, 2011, Japanese patent application JP2011-204787 filed Sep. 20, 2011 and Japanese patent application JP2011-237452 filed Oct. 28, 2011. The content of these aforementioned documents is herewith incorporated by reference.

TECHNICAL FIELD OF THE INVENTION

The present invention relates to a hard alloy and a cutting tool.

BACKGROUND ART OF THE INVENTION

At present, a sintered hard alloy containing more than 70 mass % of WC and a cermet containing Ti as the main component are used as cutting tools. The sintered hard alloy has high wear resistance and high fracture resistance and has been widely used for cutting tools. However, due to the price rise of WC raw materials, it has been examined to reduce the use amount of the WC by replacing the WC by other materials. On the other hand, the cermet has wear resistance higher than that of the sintered hard alloy but has a problem in that the fracture resistance is lower than that of the sintered hard alloy, which limits the use thereof.

For example, Japanese Unexamined Patent Application Publication No. 2009-275237 discloses a cermet containing three kinds of hard phases of WC, Ti(C, N), and (Ta, Nb)C at a predetermined ratio. Moreover, NPL 1 discloses adding 20 to 50 volume % of WC raw materials to a cermet, and then firing the same while adjusting a nitrogen current atmosphere and a vacuum atmosphere to thereby form a surface portion with a predetermined thickness (portion in which the presence ratio of carbide, nitride, and carbonitride of metals of Groups IV, V, and VI in periodic table, other than WC, is low and the presence ratio of WC is high) on the surface of a sintered compact.

The following is a list of aforementioned background art
PTL 1: Japanese Unexamined Patent Application Publication No. 2009-275237
Non Patent Literature
NPL 1: Daisuke TAKEZAWA and other 4 persons, "Influence of WC Addition Amount and Firing Atmosphere on Superficial Region Formation of WC Phase Remaining Cermet", Japan Society of Powder and Powder Metallurgy Autumn Meeting Lecture Collection in 2010, p. 105

However, with the cermet (hard alloy) in which the three kinds of hard phases are dispersed as in Japanese Unexamined Patent Application Publication No. 2009-275237, the hardness of the alloy has become high to increase the wear resistance of tools but the fracture resistance of the alloy has not been sufficient. Even the hard alloy in which the surface portion is formed on the surface of the alloy as in Daisuke TAKEZAWA and other 4 persons, "Influence of WC Addition Amount and Firing Atmosphere on Superficial Region Formation of WC Phase Remaining Cermet", Japan Society of Powder and Powder Metallurgy Autumn Meeting Lecture Collection in 2010, p. 105 has had a problem in that the fracture resistance of the alloy has been inferior to that of the sintered hard alloy.

The present invention is to provide a hard alloy and a cutting tool with reduced WC content and improved fracture resistance.

SUMMARY OF THE INVENTION

A hard alloy of the present invention contains a hard phase comprising a main component that contains: 50 to 70 mass % of WC, 15 to 30 mass % of TiCN, and 0 to 10 mass % of at least one kind of carbide, nitride, carbonitride of one or more metals of Groups IV, V, and VI of periodic table, other than W and Ti; a WC phase; and a composite hard phase, and a binder phase containing 6 to 12 mass % of at least one of Co and Ni as a main component, and a surface portion having a WC content higher than a WC content of an internal portion of the hard alloy is present on a surface of the hard alloy and an average size of grains in the WC phase in the surface portion is larger than an average size of grains in the WC phase in the internal portion.

ADVANTAGEOUS EFFECTS OF INVENTION

According to the hard alloy and the cutting tool of present invention, although a WC content proportion thereof is lower than that of the sintered hard alloy, the fracture resistance can be improved as compared with the conventional cermet.

BRIEF DESCRIPTION OF DRAWINGS

FIG. 3 is electron beam backscattering diffraction (EBSD) data of the surface and in the vicinity of the surface of the hard alloy of FIGS. 1 and 2.

DETAILED DESCRIPTION OF THE DRAWINGS

An example of the hard alloy of the present invention is described with reference to the scanning electron microscope photograph of the cross section of the surface and in a vicinity of the surface of FIG. 1($a$), the scanning electron microscope photograph of the cross section in the internal portion of FIG. 1($b$), the profile of the Vickers hardness Hv in the vicinity of the surface of FIG. 1($c$), the scanning electron microscope photograph of the surface and in the vicinity of the surface of the hard alloy of FIG. 2($a$), the distribution diagram of Co obtained by wavelength dispersive X-ray spectrometry (WDS) of the surface and in the vicinity of the surface of the hard alloy of FIG. 2($b$), the distribution diagram of N (nitrogen) obtained by wavelength dispersive X-ray spectrometry (WDS) of the surface and in the vicinity of the surface of the hard alloy of FIG. 2($c$), and FIG. 3 showing the electron beam backscattering diffraction (EBSD) data of the surface and in the vicinity of the surface of the hard alloy of FIGS. 1 and 2.

Figure 1:
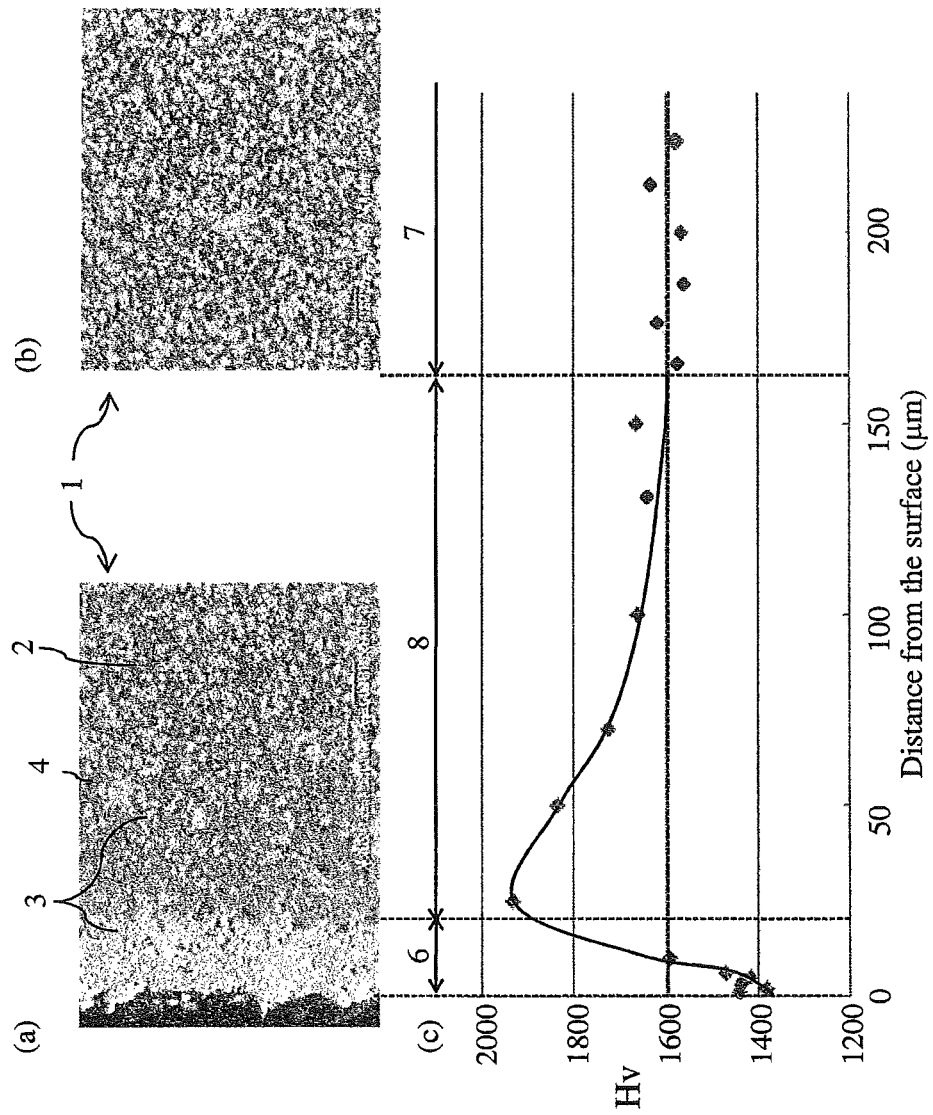
FIG. 1($a$) is a scanning electron microscope photograph of the cross section of the surface and in a vicinity of the surface, FIG. 1($b$) is a scanning electron microscope photograph of the cross section in the internal portion, and FIG. 1($c$) shows a distribution of Vickers hardness in the vicinity of the surface, of an exemplary hard alloy of the present invention.

The hard alloy 1 of FIG. 1 contains 50 to 70 mass % of WC, 15 to 30 mass % of TiCN, 0 to 10 mass % of at least one kind of carbide, nitride, and carbonitride of one or more metals of Groups IV, V, and VI of periodic table other than W and Ti, and 6 to 12 mass % of at least one of Co and Ni. The hard alloy 1 has a constitution containing a composite hard phase (observed in gray in the figures and also referred to as a β phase) 2 containing at least one kind of carbide, nitride, and carbonitride of one or more metals of Groups IV, V, and VI of periodic table including W and Ti, a WC phase 3 (observed in white in the figures), and a binder phase 4 (observed in black in the figures) containing at least one of Co and Ni as the main components as illustrated in FIGS. 1(a) and 1(b). A part of the metals of Groups IV, V, and VI of periodic table other than WC can also be present as carbide or nitride in addition to the carbonitride described above.

According to this embodiment, a surface portion 6 in which the content of the WC phase 3 is higher than that of the internal portion of the hard alloy 1 is present on the surface side of the hard alloy 1 as illustrated in FIG. 1(a). In the surface portion 6, the content of at least one kind of the carbide, nitride, and carbonitride of metals of Groups IV, V, and VI of periodic table other than WC is lower than that in an internal portion 7 of the hard alloy 1. Furthermore, the average size of particles in the WC phase in the surface portion 6 is larger than the average size of particles in the WC phase 3 in the internal portion 7. Thus, the mean free path between the WC phase 3-3 equivalent to the thickness of the binder phase 4 surrounding the WC phase 3 in the surface portion 6 becomes long (thick) to suppress plucking out of the WC phase, which results in the fact that the fracture resistance on the surface of the hard alloy 1 can be increased. Also in the surface portion 6, a part of the metals of Groups IV, V, and VI of periodic table other than WC can also be present as carbide or nitride in addition to the carbonitride described above.

As illustrated in FIGS. 1(a) and 1(c), a high hardness portion 8 in which the hardness is higher than that of the internal portion 7 of the hard alloy 1 is present directly under the surface portion 6. Thus, the effect of suppressing plastic deformation of the hard alloy 1 and improving the wear resistance becomes remarkable.

More specifically, in this embodiment, the three portions of the surface portion 6, the high hardness portion 8, and the internal portion 7 are present from the surface in the hard alloy 1. As is clear from FIG. 1, the surface portion 6 and the high hardness portion 8 are clearly different from each other in the constitution and the boundary therebetween is clear. When the boundary of the surface portion 6 and the high hardness portion 8 is not clear, the portions are divided as follows: a portion where the ratio of the WC phase in the total amount of the hard phase is 80 area % or more is the surface portion 6 and a portion where the ratio of the WC phase in the total amount of the hard phase is lower than the 80 area % is the high hardness portion 8. Even when the high hardness portion 8 is not present, the surface portion 6 and the internal portion 7 are clearly different from each other in the constitution and the boundary therebetween is clear. When the boundary of the surface portion 6 and the internal portion 7 is not clear, the portions can be divided as follows: a portion where the ratio of the WC phase in the total amount of the hard phase is 80 area % or more is the surface portion 6 and a portion where the ratio of the WC phase in the total amount of the hard phase is lower than the 80 area % is the internal portion 7. On the other hand, when the high hardness portion 8 is present, the boundary between the high hardness portion 8 and the internal portion 7 continuously changes as the entire hard alloy 1. Therefore, it is difficult to visually clearly distinguish the boundary. Thus, the boundary is determined from the result of the hardness distribution obtained by connecting the hardness of each measurement point of FIG. 1. More specifically, the internal portion 7 refers to a portion where the hardness is within the range of variation and does not change. The boundary of the high hardness portion 8 and the internal portion 7 is the point where the intermediate value within the range of hardness variation in the internal portion 7 and the hardness curve of the high hardness portion 8 cross each other. When analyzing the properties, such as the composition and the constitution, of the internal portion 7, the analysis is performed at a depth of 1000 μm from the surface of the hard alloy 1 far distant from the boundary with the high hardness portion 8 of the internal portion 7.

Herein, when the average size of particles in the WC phase 3 in the surface portion 6 is 1.1 to 1.5 times the average size of particles in the WC phase 3 in the internal portion 7, the fracture resistance and the wear resistance of the hard alloy 1 can be maintained with better balance. In this embodiment, the average size of particles in the WC phase 3 in the internal portion 7 is 1.5 to 4.0 μm, and a particularly desirable average size of particles is 2.7 to 3.5 μm.

Figure 2C:
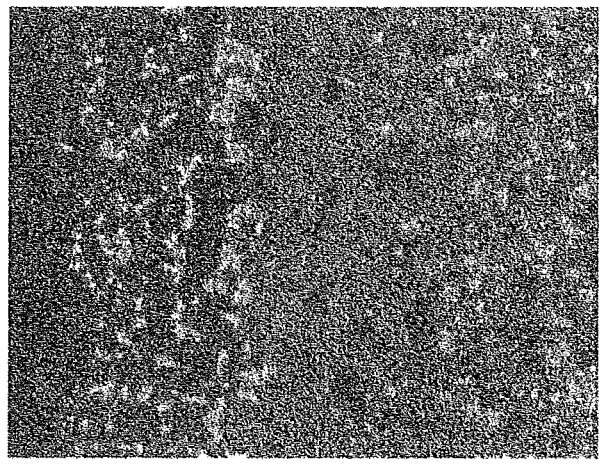
FIG. 2($a$) is a scanning electron microscope photograph, FIG. 2($b$) is a distribution diagram of Co obtained by wavelength dispersive X-ray spectrometry (WDS), and FIG. 2($c$) is a distribution diagram of N (nitrogen) obtained by wavelength dispersive X-ray spectrometry (WDS), of the surface and in the vicinity of the surface of the hard alloy of FIG. 1.
Figure 2B:
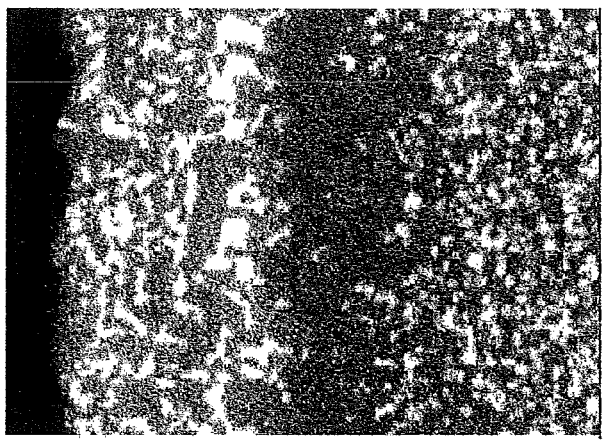

The distribution diagram of Co obtained by wavelength dispersive X-ray spectrometry (WDS) of FIG. 2 (b) shows that Co is present in a dotted manner. When considering the data of FIGS. 1 and 2, it is found that the Co content is the highest in the surface portion 6 (In the figure, the white color ratio is large.) and the Co content is the second highest in the internal portion 7 (In FIG. 2, the side near the high hardness portion 8 is referred to as the internal portion 7.), and the Co content is low (In FIG. 2 (b), the white color ratio is small.) in the high hardness portion 8. A comparison between the distribution diagram of Co of FIG. 2(b) and the distribution diagram of N of FIG. 2(c) shows that the N (nitrogen) content is the highest in the portion where the Co content is high, i.e., at the position of the binder phase 4 (In FIG. 2(c), the white color ratio is high.), the N content is the second highest at the position of the composite hard phase 2, and the N content is low at the position of the WC phase 3 (In FIG. 2(c), the white color ratio is low).

More specifically, according to FIG. 2, the content of the binder phase contained in the surface portion 6 is higher than the content of the binder phase contained in the internal portion 7 and the content of nitrogen contained in the binder phase 4 is higher than the content of nitrogen contained in the WC phase 3 in the surface portion 6. Therefore, the content of nitrogen contained in the binder phase 4 of the surface portion 6 is higher than the content of nitrogen contained in the binder phase 4 of the internal portion 7. As a result, the plastic deformation resistance of the binder phase 4 surrounding the WC phase 3 of the surface portion 6 improves to suppress shattering of the WC phase 3, which results in the fact that the fracture resistance on the surface of the hard alloy 1 can be improved.

Herein, the internal portion 7 has the same composition as the entire composition of the hard alloy 1. The surface portion 6 has a composition in which the content of the WC phase 3 is higher and the content of the composite hard phase 2 is lower than those of the internal portion 7. The high hardness portion 8 has a composition in which the content of the composite hard phase 2 is higher and the contents of the WC phase 3, Co, and nitrogen are lower as compared with the internal portion 7 and the surface portion 6.

In this embodiment, the nitrogen content in the surface portion 6 is 1.1 or more times the nitrogen content in the internal portion 7. Thus, both the fracture resistance and the wear resistance of the hard alloy 1 can be maintained with good balance. A desirable ratio of the content of nitrogen in the surface portion 6 to the content of nitrogen in the internal portion 7 is 1.08 to 1.10.

In this embodiment, the thickness of the surface portion 6 is 5 to 20 μm. Thus, the toughness of the surface of the hard alloy 1 can be increased and also the plastic deformation of the surface of the hard alloy 1 can be suppressed. In the case where the surface portion 6 has such a thickness, when the components in the hard alloy 1 form a chemical vapor deposition (CVD) film described later on the surface of the hard alloy 1, unusual growth of a part of crystals constituting the film can be suppressed and a good CVD film can be formed on the surface of the hard alloy 1. A particularly desirable thickness of the surface portion 6 is 10 to 20 μm.

According to this embodiment, the thickness of the high hardness portion 8 is 30 to 200 μm and particularly desirably 50 to 150 μm. The plastic deformation resistance of the hard alloy 1 can be improved and also the wear resistance thereof can be increased.

In this embodiment, the value of Vickers hardness at the center in the thickness direction of the surface portion 6 is within the range of 0.8 to 1.0 times the average value of Vickers hardness in the internal portion 7 and the maximum value of the Vickers hardness of the high hardness portion 8 is within the range of 1.2 to 1.3 times the average value of Vickers hardness in the internal portion 7. When the value of Vickers hardness is within this range, both the wear resistance and the fracture resistance of the hard alloy 1 can be increased.

Furthermore, in this embodiment, as shown in the electron beam backscattering diffraction (EBSD) data in the vicinity of the surface of the hard alloy 1 of FIG. 3, the average size of particles of the composite hard phase 2 decreases toward the internal portion from the surface also in the high hardness portion 8 directly under the surface portion 6, and the effect of increasing the hardness on the surface of the high hardness portion 8 to achieve good wear resistance is demonstrated. Furthermore, in this embodiment, the content of the WC phase 3 is lower in the high hardness portion 8 than in the internal portion 7 and the hardness of the high hardness portion 8 becomes high. In the EBSD data of FIG. 3, the composite hard phase 2 appears in white color, the WC phase 3 appears in gray color, and the binder phase 4 appears in black color.

On the surface of the above-described hard alloy 1, a coating layer formed by a chemical vapor deposition (CVD) method or a physical vapor deposition (PVD) method, such as an ion plating method or a sputtering method, is formed as desired. In the above-described hard alloy 1, due to the presence of the surface portion 6, the coating layer can be prevented from easy chipping and also the adhesiveness is good. In particular, although the CVD film had good wear resistance against high-speed cutting, the presence of the surface portion 6 can prevent unusual particle growth in the CVD film and achieve the formation of a coating layer containing normal particles.

The coating layer in this embodiment has a TiCN layer of 4 to 10 μm and an $Al_2O_3$ layer of 3 to 8 μm from the hard alloy 1 side. As a more specific configuration of the coating layer, a configuration of a TiN layer of 0.1 to 0.3 μm, a TiCN layer of 4 to 10 μm, a TiCNO layer of 0.1 to 0.5 μm, an $Al_2O_3$ layer of 3 to 8 μm, and a TiN layer of 0.1 to 0.5 μm from the hard alloy 1 side is mentioned. In particular, when the thickness of the $Al_2O_3$ layer is 4 to 8 μm, good fracture resistance and wear resistance are demonstrated even under such high-speed cutting conditions of a cutting speed of 250 m/min or more and particularly 300 m/m in or more that crater wear occurs in the cutting face.

The above-described hard alloy 1 can be applied to various kinds of structural members, wear-resistant tools, cutting tools, and the like due to having good wear resistance and fracture resistance and particularly can be preferably applied as cutting tools requiring high wear resistance and fracture resistance.

(Manufacturing Method)

Next, an example of a method for manufacturing the above-described hard alloy is described.

First, mixed raw material powder in which TiCN powder with an average size of particles of 0.5 to 2.0 μm and desirably 0.6 to 1.5 μm, WC powder with an average size of particles of 0.5 to 5 μm, any one kind of carbide powder, nitride powder, or carbonitride powder of metals of Groups IV, V, and VI of periodic table other than the substances described above with an average size of particles of 0.1 to 2 μm, and at least one kind of Co powder with an average size of particles of 1.0 to 3.0 μm and Ni powder with an average size of particles of 0.3 to 0.8 μm are mixed is produced. Into the mixed raw material powder, TiC powder and TiN powder are sometimes added together with the TiCN powder. These raw material powders form a solid solution during firing and constitute TiCN together in the composite hard phase after firing.

Next, the above-described mixed raw material powder is molded into a predetermined shape, such as a cutting tool shape. As the molding methods, known molding methods, such as press molding, extrusion molding, casting molding, and injection molding, can be employed. Then, by firing the above-described molded article under the following conditions, the hard alloy of the predetermined constitution described above can be produced. An example of specific firing conditions is as follows.

The firing is performed by:

(a) a process of increasing the temperature to 1050 to 1250° C., (b) a process of increasing the temperature to 1300 to 1400° C. at a temperature elevation rate $r_1$ of 5 to 10° C./min in a vacuum atmosphere, (c) a process of increasing the temperature to a firing temperature T of 1500 to 1600° C. at a temperature elevation rate $r_2$ of 0.1 to 5° C./min in an atmosphere filled with 1000 to 3000 Pa of nitrogen (N), and (d) a process of maintaining the vacuum atmosphere or the atmosphere filled with inactive gas for 0.5 to 1 hour, and then (e) cooling at a cooling rate of 3 to 15° C./m in.

Herein, when the atmosphere in the process (b) is an inactive gas atmosphere of nitrogen (N) or the like, a large amount of gas is emitted in the internal portion of the alloy and remains to form voids, which raises a possibility that a dense alloy is not obtained and the toughness of the alloy decreases. When the temperature elevation rate in the process (b) is lower than 5° C./min, the decomposition of the TiCN proceeds to the internal portion of the alloy, so that the surface portion is not formed. When the temperature elevation rate in the process (b) is higher than 10° C./min, a large amount of gas produced by the decomposition of the TiCN is emitted in the internal portion of the alloy and voids remain, so that a dense sintered compact is not obtained. When the atmosphere in the process (c) is a vacuum, the decomposition of the TiCN excessively proceeds to cause excessive firing, so that unusual particle growth occurs to make it difficult to control diameter of the particles in the WC phase 3. It is not realistic that the temperature elevation rate in the process (c) is lower than 0.1° C./min. When the temperature elevation rate in the process (c) is higher than 5° C./min, the thickness of the surface portion becomes small and also the particle growth of the WC phase in the surface portion is insufficient.

In order to achieve the configuration in which the nitrogen content of the binder phase of the surface portion is higher than the nitrogen content of the binder phase of the internal portion and the content of nitrogen contained in the binder phase is higher the content of nitrogen contained in the composite hard phase in the surface portion, it is necessary to control the atmosphere in cooling in the process (e) to an atmosphere in which nitrogen ($N_2$) is introduced in such a manner as to achieve a pressurization state of 3000 to 10000 Pa. When the content of nitrogen ($N_2$) in the process (e) is lower than 3000 Pa, the nitrogen content of the binder phase of the surface portion tends to remarkably decrease as compared with the nitrogen content of the binder phase of the internal portion. By setting the cooling rate after firing to 5 to 12° C./min, a configuration in which the average size of particles of the composite hard phase decreases toward the internal portion from the surface in the high hardness portion can be achieved.

Then, a coating layer is formed on the surface of the hard alloy as desired. As a method for forming the coating layer, first, when the layer is formed by a chemical vapor deposition (CVD) method, a TiN layer is formed as the first layer right above the hard alloy 1. As the forming conditions of the TiN layer, the layer is formed using a mixed gas containing 0.5 to 10 volume % of titanium tetrachloride ($TiCl_4$) gas and 10 to 60 volume % of nitrogen ($N_2$) gas and the balance of hydrogen ($H_2$) gas as the mixed gas composition at a film forming temperature of 800 to 940° C. (inside a chamber) and at a pressure of 8 to 50 kPa.

Next, a TiCN layer is formed as a second layer. Herein, the film forming conditions when constituting the TiCN layer by three layers of MT-TiCN layers containing a micro columnar crystal layer having a small average crystal width and a coarse columnar crystal layer having an average crystal width larger than that of this layer and an HT-TiCN layer are described.

As the film forming conditions of the micro columnar crystal layer of the MT-TiCN layers, a mixed gas containing 0.5 to 10 volume % of titanium tetrachloride ($TiCl_4$) gas, 10 to 60 volume % of nitrogen ($N_2$) gas, and 0.1 to 0.4 volume % of acetonitrile ($CH_3CN$) gas and the balance of hydrogen ($H_2$) gas is used, the film forming temperature is set to 780 to 900° C., and the pressure is set to 5 to 25 kPa. As the film forming conditions of the coarse columnar crystal layer of the MT-TiCN layers, a mixed gas containing 0.5 to 4.0 volume % of titanium tetrachloride ($TiCl_4$) gas, 10 to 40 volume % of nitrogen ($N_2$) gas, and 0.4 to 2.0 volume % of acetonitrile ($CH_3CN$) gas and the balance of hydrogen ($H_2$) gas is used, the film forming temperature is set to 780 to 900° C., and the pressure is set to 5 to 25 kPa.

The HT-TiCN layer is formed using a mixed gas containing 0.1 to 4 volume % of titanium tetrachloride ($TiCl_4$) gas, 0.1 to 10 volume % of methane ($CH_4$) gas, and 5 to 25 volume % of nitrogen ($N_2$) gas and the balance of hydrogen ($H_2$) gas at a film forming temperature of 950 to 1100° C. and at a pressure of 5 to 40 kPa.

An intermediate layer containing TiCNO is formed by setting the inside of a chamber to 950 to 1100° C. and 5 to 40 kPa, adjusting a mixed gas containing 1 to 5 volume % of titanium tetrachloride ($TiCl_4$) gas, 4 to 10 volume % of methane ($CH_4$) gas, 10 to 30 volume % of nitrogen ($N_2$) gas, and 4 to 8 volume % of carbon monoxide (CO) gas and the balance of hydrogen ($H_2$) gas, and introducing the mixed gas into the chamber for 10 to 60 minutes. The intermediate layer can also be formed without passing through the process of passing the mixed gas containing CO gas. However, in order to render the crystals constituting an α-type $Al_2O_3$ layer fine, it is desirable to pass through the process of passing the mixed gas containing CO gas.

As the film forming conditions of the $Al_2O_3$ layer, the layer is formed by introducing a mixed gas containing 0.5 to 5.0 volume % of aluminum trichloride ($AlCl_3$) gas, 0.5 to 3.5 volume % of hydrogen chloride (HCl) gas, 0.5 to 5.0 volume % of carbon dioxide ($CO_2$) gas, and 0 to 0.5 volume % of hydrogen sulfide ($H_2S$) gas and the balance of hydrogen ($H_2$) gas into a chamber and setting the film forming temperature to 950 to 1100° C. and the pressure to 5 to 10 kPa.

Furthermore, a TiN layer is formed on the upper layer of the α-type $Al_2O_3$ layer. The layer is formed using a mixed gas containing 0.1 to 10 volume % of $TiCl_4$ gas and 10 to 60 volume % of $N_2$ gas and the balance of $H_2$ gas as the mixed gas composition and setting the temperature in a reaction chamber to 800 to 1010° C. and the pressure therein to 10 to 85 kPa.

EXAMPLE 1

WC powder with an average size of particles ($d_{50}$ value) of 1.1 μm measured by a microtrac method, TiCN powder with an average size of particles of 2.0 μm, TiN powder with an average size of particles of 1.5 μm, TaC powder with an average size of particles of 2 μm, NbC powder with an average size of particles of 1.5 μm, ZrC powder with an average size of particles of 1.8 μm, $Mo_2C$ powder with an average size of particles of 1.0 μm, Ni powder with an average size of particles of 2.4 μm, and Co powder with an average size of particles of 1.9 μm were mixed at the ratios shown in Table 1 to prepare mixed powders, isopropyl alcohol (IPA) was added to the mixed powders, each mixture was subjected to wet mixing using a stainless steel ball mill and a carbide ball, 3 mass % of paraffin was added and mixed, and then each mixture was formed into granules by a spray drier.

Then, the granules for molding were pressurized at 200 MPa to be press molded into a tool shape of CNMA120408.

TABLE 1

| | Mixed raw material powder (mass %) | | | | | | | | | | |
|---|---|---|---|---|---|---|---|---|---|---|---|
| Sample No. | WC | TiCN | TiN | Total amount of Ti compound | TaC | $Mo_2C$ | NbC | ZrC | Total amount of another compound | Ni | Co | Total amount of binder phase |
| I-1 | 68 | 19.5 | 2 | 21.5 | 1 | 1 | 1 | 0.5 | 3.5 | 0 | 7 | 7 |
| I-2 | 60 | 20.5 | 3 | 23.5 | 0 | 1 | 4 | 0.5 | 5.5 | 2 | 9 | 11 |
| I-3 | 55 | 30 | 0 | 30 | 3 | 1 | 2 | 1 | 7 | 1 | 7 | 8 |
| I-4 | 65 | 22 | 1 | 23 | 2 | 0 | 1 | 0.5 | 3.5 | 0 | 8.5 | 8.5 |
| I-5 | 60 | 25 | 2 | 27 | 0 | 1 | 2 | 1 | 4 | 1 | 8 | 9 |
| I-6 | 54 | 30 | 1 | 31 | 2 | 0 | 3 | 1 | 6 | 1 | 8 | 9 |
| I-7 | 64 | 19.5 | 2 | 21.5 | 2 | 0 | 2 | 0.5 | 4.5 | 0 | 10 | 10 |
| I-8 | 65 | 20.5 | 1 | 21.5 | 3 | 0 | 1 | 1 | 5 | 0 | 8.5 | 8.5 |

Furthermore, each molded article was placed into a firing furnace, and then fired under firing conditions of (a) increasing the temperature to 1200° C. at a temperature elevation rate of 10° C./min, (b) increasing the temperature to 1400° C. at a temperature elevation rate $r_1$ shown in Table 2 in a vacuum atmosphere, (c) increasing the temperature to a firing temperature T at a temperature elevation rate $r_2$ in an atmosphere filled with nitrogen ($N_2$) gas shown in Table 2 (referred to as "Atmosphere (Pa)" in Table 2) and maintaining the state for 1 hour, and then (d) cooling at a cooling rate of 10° C./min. obtained.

For the obtained hard alloys, the vicinity of the surface was subjected to scanning electron microscope (SEM) observation and electron beam backscattering diffraction (EBSD) measurement. With photographs (10000×), arbitrary five portions of each of the surface and the internal portion were subjected to image analysis in a 8 μm×8 μm region using a commercially available image analysis software to confirm the presence of the hard phase and the presence of the surface portion and also calculate the area ratio and the average size of particles thereof. The area ratio was calculated by converting the image data in one visual field of the photographs into the gray scale, creating a histogram of the brightness based on the brightness in each dot, specifying a group with the highest brightness as the WC phase, a group with the second highest brightness as composite particles, and a group with the third highest brightness as the binder phase, and then defining the ratio of the number of the dots as the area ratio. The transitional region between each group was calculated by defining the middle brightness as the threshold value. Furthermore, the average size of particles of the composite hard phases on the side of the surface portion and on the side of the internal portion were measured by defining the depth of 20 vim from the interface between the surface portion and the internal portion of the high hardness portion as the boundary. The results were shown in Tables 2 to 4.

The composition in each of the hard alloys after firing was the same as the composition indicated in each of the mixed raw material powders of Table 1 except the fact that the TiN was changed to TiCN during firing. More specifically, the WC content was the same as the WC content in the mixed raw material powders of Table 1. The TiCN content was the same as the total content of the TiCN and the TiN (Ti compound total amount) in the mixed raw material powders of Table 1.

The content of one or more kinds of carbonitrides of metals of Groups IV, V, and VI of periodic table other than W and Ti is the same as the total metal content of the other compounds in the mixed raw material powders of Table 1 and all of the substances were formed into carbonitrides. The content of Co and Ni was the same as the total content of the Co and the Ni in the mixed raw material powders of Table 1.

The Vickers hardness was measured with a load of 50 g at measurement points on a surface formed by obliquely polishing the hard alloy. Each of the measurement points correspond to respective depth from the surface of the hard alloy. The profile of the measured Vickers hardness is illustrated in FIG. 1(c). From this profile, the Vickers hardness Hvd at the center in the thickness direction of the surface portion, the average Vickers hardness Hvi in the internal portion, and the maximum value Hvh of the Vickers hardness in the high hardness portion were obtained. The results were shown in Tables 2 to 4.

TABLE 2

| | Firing conditions | | | | Surface portion | | | | | |
| --- | --- | --- | --- | --- | --- | --- | --- | --- | --- | --- |
| Sample No. | Temperature elevation rate $r_1$ (° C./min) | Atmosphere (Pa) | Temperature elevation Rate $r_2$ (° C./min) | Firing temperature T(° C.) | Composite hard phase (area %) | WC phase (area %) | WC average particle size (μm) | Binder phase (area %) | Thickness (μm) | Hardness Hv |
| I-1 | 5.0 | 2000 | 2.0 | 1570 | 0.5 | 92.0 | 3.8 | 7.5 | 15.0 | 1500 |
| I-2 | 6.0 | 2000 | 1.5 | 1520 | 1.5 | 89.0 | 3.1 | 9.5 | 10.0 | 1300 |
| I-3 | 8.0 | 3000 | 4.0 | 1560 | 1.0 | 91.0 | 3.0 | 8.0 | 6.0 | 1500 |
| I-4 | 6.0 | 1500 | 1.0 | 1550 | 0.5 | 90.0 | 3.6 | 9.5 | 12.0 | 1400 |
| I-5 | 13.0 | 2000 | 1.5 | 1550 | 1.5 | 90.0 | 2.3 | 8.5 | 6.0 | 1550 |
| I-6 | 2.0 | 2000 | 1.5 | 1550 | — | — | — | — | — | — |
| I-7 | 5.0 | 100 | 1.0 | 1520 | 1.0 | 89.0 | 2.8 | 10.0 | 22.0 | 1200 |
| I-8 | 5.0 | 1500 | 8.0 | 1520 | 1.0 | 90.0 | 2.5 | 9.0 | 4.0 | 1600 |

TABLE 3

| | High hardness portion | | | | | | | | Internal portion | | | | |
| --- | --- | --- | --- | --- | --- | --- | --- | --- | --- | --- | --- | --- | --- |
| | | Average size of particles in composite hard phase (μm) | | | WC average particle size | | | | | | WC average particle size | | |
| Sample No. | Composite particles (area %) | Surface | Inside | WC phase (area %) | (μm) | Binder phase (area %) | Thickness (μm) | Hardness Hvh | Composite Hard phase (area %) | WC phase (area %) | (μm) | Binder phase (area %) | Hardness Hvi |
| I-1 | 64.0 | 2.5 | 0.9 | 31.0 | 2.8 | 5.0 | 50.0 | 2050 | 46.5 | 46.0 | 2.8 | 7.5 | 1600 |
| I-2 | 67.0 | 1.3 | 0.7 | 25.0 | 2.6 | 8.0 | 60.0 | 1900 | 50.0 | 38.0 | 2.6 | 12.0 | 1500 |
| I-3 | 74.0 | 1.8 | 1.3 | 20.0 | 2.7 | 6.0 | 70.0 | 1800 | 58.0 | 33.0 | 2.7 | 9.0 | 1550 |
| I-4 | 63.0 | 1.9 | 0.9 | 30.0 | 3.0 | 7.0 | 60.0 | 1960 | 45.0 | 45.0 | 3.0 | 10.0 | 1520 |
| I-5 | 73.0 | 1.6 | 1.6 | 20.0 | 2.4 | 7.0 | 50.0 | 2100 | 49.0 | 41.0 | 2.4 | 10.0 | 1530 |
| I-6 | 78.0 | 2.2 | 1.3 | 16.0 | 3.0 | 6.0 | 100.0 | 2200 | 58.0 | 32.0 | 3.0 | 10.0 | 1540 |
| I-7 | 68.0 | 1.3 | 1.1 | 24.0 | 2.5 | 8.0 | 60.0 | 1950 | 44.0 | 45.0 | 2.8 | 11.0 | 1550 |
| I-8 | 64.0 | 2.0 | 0.9 | 29.0 | 2.6 | 7.0 | 70.0 | 2100 | 46.0 | 44.0 | 2.6 | 10.0 | 1560 |

Next, on the obtained hard alloys, TiN of 0.2 μm, TiCN containing TiCN 1 to 3 of 10 μm in total, TiCNO of 0.1 μm, $Al_2O_3$ of 3 μm, and TiN of 0.1 μm were laminated by a CVD method under the film forming conditions of Table 5 to produce cutting tools. A cutting test was performed under the following cutting conditions using the cutting tools. The results were shown together in Table 4.
(Wear Evaluation)
Target cutting material: SCM435
Cutting speed: 250 m/min
Feeding: 0.30 mm/rev
Cutting depth: 2.0 mm
Cutting state: Wet type (Use of water soluble cutting fluid)
Evaluation method: Time until the wear amount reaches 0.2 mm
(Fracture Evaluation)
Target cutting material: SCM440 (with 5 mm width×4 grooves)
Cutting speed: 250 m/min
Feeding: 0.30 mm/rev
Cutting: 1.5 mm
Cutting state: Wet type (Use of water soluble cutting fluid)
Evaluation method: Number of times of impacts until the tip of a blade is fractured

TABLE 4

| Sample No. | Hvd/Hvi | Hvh/Hvi | Wear evaluation(min) | Fracture evaluation (number of times) |
|---|---|---|---|---|
| I-1 | 0.94 | 1.28 | 18 | 2000 |
| I-2 | 0.87 | 1.27 | 16 | 1900 |
| I-3 | 0.97 | 1.16 | 15 | 1600 |
| I-4 | 0.92 | 1.29 | 20 | 2200 |
| I-5 | 1.01 | 1.37 | 12 | 600 |
| I-6 | — | 1.43 | 12 | 500 |
| I-7 | 0.77 | 1.26 | 10 | 800 |
| I-8 | 1.03 | 1.35 | 13 | 700 |

TABLE 5

| Coating layer | | Mixed gas composition (volume %) | Temperature (° C.) | Pressure (kPa) |
|---|---|---|---|---|
| First layer (TiN) | | $TiCl_4$: 3.0, $N_2$: 30, $H_2$: Balance | 880 | 16 |
| TiCN | 1 | $TiCl_4$: 3.0, $N_2$: 30, $CH_3CN$: 0.3, $H_2$: Balance | 865 | 9 |
| | 2 | $TiCl_4$: 2.5, $N_2$: 20, $CH_3CN$: 1.0, $H_2$: Balance | 865 | 9 |
| | 3 | $TiCl_4$: 3.0, $N_2$: 7.0, $CH_4$: 6.0, $H_2$: Balance | 1010 | 30 |
| TiCNO | | $TiCl_4$: 1.5, $CH_4$: 3.5, $N_2$: 27, CO: 6, $H_2$: Balance | 1010 | 10 |
| $Al_2O_3$ | | $AlCl_3$: 1.5, HCl: 2, $CO_2$: 4, $H_2S$: 0.3, $H_2$: Balance | 1010 | 9 |
| Top layer (TiN) | | $TiCl_4$: 3.0, $N_2$: 20, $H_2$: Balance | 1010 | 30 |

From Tables 1 to 5, in the sample No. I-6 in which the temperature elevation rate in the process (b) is lower than 5° C./min, the decomposition of the TiCN proceeded into the internal portion of the alloy, so that a surface portion was not formed. In the sample No. I-5 in which the temperature elevation rate in the process (b) is higher than 10° C./min, a large amount of gas produced by the decomposition of the TiCN was emitted in the internal portion of the alloy, and voids remained, so that a dense sintered compact was not obtained. In the sample No. I-5, the average size of particles in the WC phase in the surface portion was smaller than the average size of particles in the WC phase in the internal portion of the alloy. In the sample No. I-6, a surface portion was not generated and the wear resistance and the fracture resistance were poor in both the samples. In the sample No. I-7 in which the $N_2$ atmosphere in the process (c) is lower than 1000 Pa, the decomposition of the TiCN excessively proceeded to cause excessive firing, so that unusual particle growth occurred to make it difficult to control the particle diameter and the average size of particles in the WC phase in the internal portion was the same as the average size of particles in the WC phase in the surface portion. In the sample No. I-8 in which the temperature elevation rate in the process (c) is higher than 5° C./min, the thickness of the surface portion was small and the average size of particles in the WC phase in the surface portion was smaller than the average size of particles in the WC phase in the internal portion of the alloy. In both the samples No. I-7 and I-8, the wear resistance and the fracture resistance were poor.

On the other hand, in the samples No. I-1 to I-4 whose constitution was within the scope of the present invention, good wear resistance was demonstrated, the fracture resistance was also good, and the tool life was long.

EXAMPLE 2

Mixed powders prepared using the same raw material powders as those of Example 1 at the ratios shown in Table 6 were mixed in the same manner as in Example 1, granulated, and then molded.

TABLE 6

| Sample No. | Mixed raw material powder (mass %) | | | | | | | | | | | |
|---|---|---|---|---|---|---|---|---|---|---|---|---|
| | Ti compound | | | | Other compounds | | | | | Binder phase | | |
| | WC | TiCN | TiN | Total amount | TaC | $Mo_2C$ | NbC | ZrC | Total amount | Ni | Co | Total amount |
| II-1 | 60 | 20.5 | 3 | 23.5 | 0 | 1 | 4 | 0.5 | 5.5 | 2 | 9 | 11 |
| II-2 | 65 | 18.5 | 2 | 20.5 | 1 | 1 | 3 | 0.5 | 5.5 | 2 | 7 | 9 |
| II-3 | 55 | 27 | 3 | 30 | 3 | 1 | 2 | 1 | 7 | 1 | 7 | 8 |
| II-4 | 65 | 20 | 3 | 23 | 2 | 0 | 1 | 0.5 | 3.5 | 0 | 8.5 | 8.5 |
| II-5 | 60 | 25 | 2 | 27 | 0 | 1 | 2 | 1 | 4 | 1 | 8 | 9 |
| II-6 | 55 | 29 | 1 | 30 | 3 | 1 | 2 | 1 | 7 | 1 | 7 | 8 |
| II-7 | 64 | 19.5 | 2 | 21.5 | 1 | 0 | 1 | 0.5 | 2.5 | 0 | 12 | 12 |
| II-8 | 65 | 20.5 | 2 | 22.5 | 2 | 0 | 1 | 1 | 4 | 0 | 8.5 | 8.5 |
| II-9 | 56 | 28 | 1 | 29 | 2 | 0 | 3 | 1 | 6 | 1 | 8 | 9 |

The molded article was placed into a firing furnace, and then fired in the same manner as in Example 1, except performing the process (b) of increasing the temperature to 1400° C. at a temperature elevation rate $r_1$ shown in Table 7, the process (c) of increasing the temperature to a firing temperature T at a temperature elevation rate $r_2$ in an atmosphere filled with nitrogen ($N_2$) gas shown in Table 7 (referred to as "Atmosphere (Pa)" in Table 7), and then the process (e) of cooling at a cooling rate of 10° C./min in the $N_2$ atmosphere shown in Table 7.

content of nitrogen contained in each portion was measured by Auger Electron Spectroscopy (AES). The results were shown in Tables 7 to 9. The composition in each of the hard alloys after firing was the same as the composition indicated in each of the mixed raw material powders of Table 6 except the fact that the TiN was changed to TiCN during firing.

The Vickers hardness was measured in the same manner as in Example 1 and the profile of Vickers hardness was illustrated in FIG. 1(c). From this profile, the value of Vickers hardness Hvd at the center in the thickness direction of the surface portion, the average value of Vickers hardness Hvi in the internal portion, and the maximum value of the Vickers hardness Hvh in the high hardness portion were obtained. The results were shown in Tables 7 to 9.

TABLE 7

| Sample No. | Firing conditions | | | | | Surface portion | | | | | | | |
|---|---|---|---|---|---|---|---|---|---|---|---|---|---|
| | | | | | | Composite hard phase | | WC phase | | Binder phase | | | |
| | Temperature elevation rate $r_1$ | Atmosphere (Pa) | Temperature elevation rate $r_2$ | Firing Temperature T(° C.) | Atmosphere In cooling | Ratio (area %) | N content (atomic ratio) | Ratio (area %) | Average particle size (μm) | Ratio (area %) | N content (atomic ratio) | Thickness (μm) | Hardness Hvd |
| II-1 | 5.0 | 2000 | 2.5 | 1570 | 6 kPa | 0.3 | 0.8 | 88.0 | 3.3 | 11.7 | 8.1 | 8.0 | 1350 |
| II-2 | 6.0 | 2000 | 1.5 | 1530 | 9 kPa | 0.2 | 0.7 | 90.0 | 3.5 | 9.8 | 8.5 | 13.0 | 1400 |
| II-3 | 8.0 | 1000 | 5.0 | 1550 | 3 kPa | 0.4 | 1.2 | 90.5 | 2.8 | 9.1 | 7.8 | 6.0 | 1500 |
| II-4 | 6.0 | 3000 | 1.0 | 1560 | 6 kPa | 0.2 | 0.6 | 90.0 | 3.4 | 9.8 | 8.2 | 10.0 | 1400 |
| II-5 | 14.0 | 2000 | 1.5 | 1550 | 6 kPa | 0.2 | 1.1 | 90.0 | 2.6 | 9.8 | 5.2 | 6.0 | 1000 |
| II-6 | 2.0 | 1000 | 1.5 | 1550 | 6 kPa | — | — | — | — | — | — | — | — |
| II-7 | 6.0 | 100 | 2.0 | 1550 | 5 kPa | 0.3 | 0.7 | 86.5 | 3.0 | 13.2 | 3.7 | 20.0 | 1150 |
| II-8 | 6.0 | 1500 | 10.0 | 1560 | 5 kPa | 0.2 | 1.1 | 90.0 | 2.3 | 9.8 | 4.6 | 4.0 | 1600 |
| II-9 | 8.0 | 2000 | 1.5 | 1570 | 1 kPa | 0.3 | 0.8 | 90.0 | 2.8 | 9.7 | 6.2 | 10.0 | 1560 |

The obtained hard alloys were confirmed for the presence of a hard phase and the presence of a surface portion and the area ratios thereof were calculated in the same manner as in Example 1. In the same region, the distribution states of Co and N (nitrogen) were confirmed by wavelength dispersive X-ray spectrometry (WDS). Further, in the same region, the

TABLE 8

| Sample No. | High hardness portion | | | | | | | | | |
|---|---|---|---|---|---|---|---|---|---|---|
| | Composite hard phase | | | | WC phase | | Binder phase | | | |
| | Ratio (area %) | N content (atomic ratio) | Average particle size (μm) | | Ratio (area %) | Average particle size (μm) | Ratio (area %) | N content (atomic ratio) | Thickness (μm) | Hardness Hvh |
| | | | Surface | Inside | | | | | | |
| II-1 | 64.0 | 7.3 | 2.4 | 1.0 | 28.0 | 2.8 | 8.0 | 0.6 | 60.0 | 1950 |
| II-2 | 61.0 | 7.4 | 1.4 | 0.7 | 32.0 | 2.9 | 7.0 | 0.5 | 50.0 | 1900 |
| II-3 | 67.0 | 7.1 | 1.8 | 1.2 | 28.0 | 2.6 | 5.0 | 0.6 | 70.0 | 2000 |
| II-4 | 64.0 | 7.5 | 2.0 | 0.9 | 30.0 | 2.9 | 6.0 | 0.7 | 60.0 | 1960 |
| II-5 | 73.0 | 6.0 | 1.6 | 0.8 | 20.0 | 2.4 | 7.0 | 0.6 | 60.0 | 1300 |
| II-6 | 78.0 | 7.3 | 2.3 | 1.2 | 16.0 | 3.0 | 6.0 | 0.5 | 110.0 | 2200 |
| II-7 | 67.0 | 6.9 | 1.6 | 1.6 | 24.0 | 2.5 | 9.0 | 0.5 | 60.0 | 1880 |
| II-8 | 64.0 | 7.0 | 2.1 | 0.8 | 29.0 | 2.6 | 7.0 | 0.7 | 50.0 | 2100 |
| II-9 | 63.0 | 6.9 | 2.4 | 1.5 | 30.0 | 2.7 | 7.0 | 0.6 | 60.0 | 2050 |

Next, a coating layer of the same specification as that of Example 1 was formed on the obtained hard alloys to produce cutting tools. A cutting test was performed under the same cutting conditions as those of Example 1 using the cutting tools. The results were shown together in Table 9.

TABLE 9

| | Internal portion | | | | | | | | | | Fracture |
|---|---|---|---|---|---|---|---|---|---|---|---|
| | Composite hard phase | | WC phase | | Binder phase | | | | | Wear | evaluation |
| Sample No. | Ratio (area %) | N content (atomic ratio) | Ratio (area %) | Average particle size (μm) | Ratio (area %) | N content (atomic ratio) | Hardness Hvi | Hvd/ Hvi | Hvh/ Hvi | evaluation (min) | (number of times) |
| II-1 | 50.0 | 7.1 | 38.0 | 2.8 | 12.0 | 7.5 | 1550 | 0.87 | 1.26 | 17 | 2000 |
| II-2 | 45.0 | 7.3 | 44.5 | 3.1 | 10.5 | 7.8 | 1520 | 0.92 | 1.25 | 18 | 2200 |
| II-3 | 57.0 | 6.9 | 33.0 | 2.6 | 10.0 | 7.0 | 1600 | 0.94 | 1.25 | 18 | 1700 |
| II-4 | 45.0 | 7.4 | 45.0 | 3.0 | 10.0 | 7.7 | 1530 | 0.92 | 1.28 | 20 | 2300 |
| II-5 | 49.0 | 7.1 | 41.0 | 2.8 | 10.0 | 5.2 | 1230 | 1.01 | 1.37 | 13 | 600 |
| II-6 | 58.0 | 7.3 | 33.0 | 3.0 | 9.0 | 2.5 | 1540 | — | 1.43 | 12 | 500 |
| II-7 | 43.0 | 6.8 | 44.0 | 3.2 | 13.0 | 3.8 | 1480 | 0.78 | 1.27 | 5 | 1200 |
| II-8 | 46.0 | 6.9 | 44.0 | 2.9 | 10.0 | 5.6 | 1530 | 1.05 | 1.37 | 14 | 600 |
| II-9 | 56.0 | 7.1 | 34.0 | 2.9 | 10.0 | 7.0 | 1550 | 1.01 | 1.32 | 13 | 700 |

From Tables 6 to 9, in the sample No. II-6 in which the temperature elevation rate in the process (b) is lower than 5° C./min, the decomposition of the TiCN proceeded into the internal portion of the alloy, so that a surface portion was not formed. In the sample No. II-5 in which the temperature elevation rate in the process (b) is higher than 10° C./min, a large amount of gas produced by the decomposition of the TiCN was emitted in the internal portion of the alloy, and voids remained, so that a dense sintered compact was not obtained and the nitrogen content of the binder phase of the surface portion was the same as that of the binder phase of the internal portion of the alloy. In both the samples, the wear resistance and the fracture resistance were poor. In the sample No. II-7 in which the $N_2$ atmosphere in the process (c) is lower than 1000 Pa, the decomposition of the TiCN excessively proceeded to cause excessive firing, so that unusual particle growth occurred to make it difficult to control the nitrogen content of the binder phase and the nitrogen content of the binder phase of the surface portion was lower than the nitrogen content of the binder phase of the internal portion of the alloy. In the sample No. II-8 in which the temperature elevation rate in the process (c) is higher than 5° C./min, the thickness of the surface portion was small and the nitrogen content of the binder phase of the surface portion was lower than the nitrogen content of the binder phase of the internal portion of the alloy. In both the samples No. II-7 and II-8, the wear resistance and the fracture resistance were poor. In the sample No. II-9 in which the atmosphere in cooling was not a pressurization atmosphere of 3000 Pa or more of nitrogen, the nitrogen content of the binder phase of the surface portion was lower than the nitrogen content of the binder phase of the internal portion, which resulted in the fact that the wear resistance and the fracture resistance were poor. Also in all the samples No. II-5 and II-7 to II-9, the average size of particles in the WC phase in the surface portion was smaller than the average size of particles in the WC phase in the internal portion of the alloy.

On the other hand, in the samples No. II-1 to II-4 containing a cermet whose constitution was within the scope of the present invention, good wear resistance was demonstrated, the fracture resistance was also good, and the tool life was long.

EXAMPLE 3

A cutting tool was produced in the same manner as in the sample No. II-1 of Example 2, except changing the configuration of a coating layer in such a manner as to change the thickness as follows: TiN of 0.2 μm, TiCN of 9 μm, TiCNO of 0.1 μm, $Al_2O_3$ of 5 μm, and TiN of 0.1 μm, and then the cutting performance was evaluated in the same manner as in Example 2. Then, the wear resistance was evaluated as 22 minutes and the fracture resistance was evaluated as 2200 times.

REFERENCE SIGNS LIST

1 Hard alloy
2 Composite hard phase
3 WC phase
4 Binder phase
6 Surface portion
7 Internal portion
8 High hardness portion

The invention claimed is:
1. A hard alloy comprising: a hard phase and a binder phase, the hard phase comprising a main component, a WC phase and a composite hard phase, wherein:
   the main component contains with respect to total mass of the hard alloy:
      50 to 70 mass % of WC;
      15 to 30 mass % of TiCN; and
      0 to 10 mass % of at least one kind of carbide, nitride, and carbonitride of one or more metals of Groups IV, V, and VI of periodic table, other than W and Ti;
   the binder phase contains 6 to 12 mass % of at least one of Co and Ni as a main component with respect to total mass of the hard alloy;
   a surface portion having a WC content higher than a WC content of an internal portion of the hard alloy is located at a surface of the hard alloy; and
   an average size of grains in the WC phase in the surface portion is larger than an average size of grains in the WC phase in the internal portion.
2. The hard alloy according to claim 1, wherein the average size of grains in the WC phase in the surface portion is 1.1 to 1.5 times as high as the average size of grains in the WC phase in the internal portion.
3. The hard alloy according to claim 1, wherein a thickness of the surface portion is 5 to 20 μm.
4. The hard alloy according to claim 1, wherein a high hardness portion having a hardness that is higher than a hard- ness of the internal portion of the hard alloy is located directly underneath the surface portion.

5. The hard alloy according to claim 4, wherein a content of the WC phase in the high hardness portion is lower than a content of the WC phase in the internal portion.

6. The hard alloy according to claim 4, wherein an average size of grains in the composite hard phase in the high hardness portion decreases from the surface portion toward the internal portion.

7. The hard alloy according to claim 1, wherein Vickers hardness in a middle within surface portion in a thickness direction is 0.8 to 1.0 times as high as an average Vickers hardness in the internal portion.

8. The hard alloy according to claim 4, wherein a maximum Vickers hardness in the high hardness portion is 1.2 to 1.3 times as high as an average Vickers hardness in the internal portion.

9. The hard alloy according to claim 1, wherein a nitrogen content of the binder phase in the surface portion is higher than a nitrogen content of the binder phase of the internal portion, and is higher than a nitrogen content of the composite hard phase.

10. The hard alloy according to claim 9, wherein the nitrogen content of the binder phase in the surface portion is by 1.1 times or more higher than the nitrogen content of the binder phase in the internal portion.

11. A cutting tool, comprising the hard alloy according to claim 1.

12. The cutting tool according to claim 11, further comprising a coating layer on a surface of the hard alloy.

13. The cutting tool according to claim 12, wherein the coating layer comprises:
a TiCN layer on the surface of the hard alloy, having a thickness of 4 to 10 μm; and
an $Al_2O_3$ layer on the TiCN layer, having a thickness of 3 to 8 μm.

* * * * *

UNITED STATES PATENT AND TRADEMARK OFFICE
CERTIFICATE OF CORRECTION

PATENT NO. : 9,228,252 B2
APPLICATION NO. : 14/129492
DATED : January 5, 2016
INVENTOR(S) : Hideyoshi Kinoshita et al.

It is certified that error appears in the above-identified patent and that said Letters Patent is hereby corrected as shown below:

Specification:

Column 5, line 64: Please delete "300 m/m in" between the words "particularly" and "or", and write "300 m/min" in place thereof.

Column 9, line 67: Please delete "20 vim" between the words "of" and "from", and write "200 µm" in place thereof.

Signed and Sealed this
Nineteenth Day of April, 2016

Michelle K. Lee
*Director of the United States Patent and Trademark Office*